(12) United States Patent
Subashchandrabose et al.

(10) Patent No.: US 7,644,248 B2
(45) Date of Patent: Jan. 5, 2010

(54) MECHANISM TO GENERATE LOGICALLY DEDICATED READ AND WRITE CHANNELS IN A MEMORY CONTROLLER

(75) Inventors: Ramesh Subashchandrabose, Bangalore (IN); Anupam Mohanty, Bangalore (IN); Rajat Agarwal, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 547 days.

(21) Appl. No.: 11/528,774

(22) Filed: Sep. 27, 2006

(65) Prior Publication Data

US 2008/0077761 A1 Mar. 27, 2008

(51) Int. Cl.
*G06F 13/00* (2006.01)
(52) U.S. Cl. .................. 711/167; 711/168
(58) Field of Classification Search .......... 711/167, 711/168
See application file for complete search history.

(56) References Cited

U.S. PATENT DOCUMENTS

| 5,504,876 | A  | * | 4/1996 | Dougall et al. ............. 711/167 |
| 2003/0167385 | A1 | * | 9/2003 | Lai et al. ................... 711/167 |
| 2006/0020729 | A1 | * | 1/2006 | Nakamura et al. ......... 710/113 |
| 2006/0095592 | A1 | * | 5/2006 | Borkenhagen ............... 710/2 |

FOREIGN PATENT DOCUMENTS

GB 2248322 4/1992

* cited by examiner

*Primary Examiner*—Matt Kim
*Assistant Examiner*—John P Fishburn
(74) *Attorney, Agent, or Firm*—Blakely, Sokoloff, Taylor & Zafman LLP

(57) ABSTRACT

According to one embodiment, a system is disclosed. The system includes a memory controller to schedule read commands to frames via a first dedicated command slot and to schedule write commands and corresponding data to frames via a dedicated second or third command slot.

18 Claims, 4 Drawing Sheets

MECHANISM TO GENERATE LOGICALLY DEDICATED READ AND WRITE CHANNELS IN A MEMORY CONTROLLER

FIELD OF THE INVENTION

The present invention relates to computer systems; more particularly, the present invention relates to memory controllers.

BACKGROUND

Fully Buffered DIMM (or FB-DIMM) Dynamic Random Access Memory (DRAM) memory devices provide a memory solution that can be used to increase reliability, speed and density of memory systems. Traditionally, data lines from a memory controller are connected to data lines in every DRAM module. As memory width, as well as access speed, increases, the signal degrades at the interface of the interconnect and the device. This limits the speed and/or the memory density. FB-DIMM devicers take a different approach to solve this problem.

The FB-DIMM architecture includes an Advanced Memory Buffer (AMB) between the memory controller and the memory module. Unlike the parallel interconnect architecture of traditional DRAMs, a FB-DIMM has a serial interface between the memory controller and the AMB that enables an increase to the width of the memory without increasing the pin count of the memory controller beyond a feasible level. With this architecture, the memory controller does not write to the memory module directly, rather it is done via the AMB.

FB-DIMM devices typically allow the memory controller to pack up to three memory commands in one frame. The duration of one FB-DIMM frame is one DRAM command. Thus in FB-DIMM based memory controllers, the memory controller theoretically has an opportunity to transmit three DRAM commands in one cycle.

Practically, however, two Read Column Address Strobes (CAS) commands cannot be transmitted back to back in a single FB-DIMM channel because of contention in the memory to memory controller (e.g., or northbound (NB)) FB-DIMM lanes. For instance, the memory controller typically has to provide one no operation (NOP) frame between two read CAS commands for a read having a burst length of four.

The NOP frame is inserted to slow down the commands so that data doesn't overlap for different read commands. Thus, the insertion of the NOP frame restricts a host from sending three read CAS commands in a single FB-DIMM frame. Due to this restriction, most of the designs include a single command mode for keeping the memory controller scheduler simple.

Designs that incorporate a three command mode, face complexity issues in resolving conflicts between the commands before scheduling. A problem exists in one command scenarios in which every write command introduces a minimum two idle frames in NB lanes.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for generating logically dedicated read and write channels in a memory controller accessing a FB-DIMM memory device is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
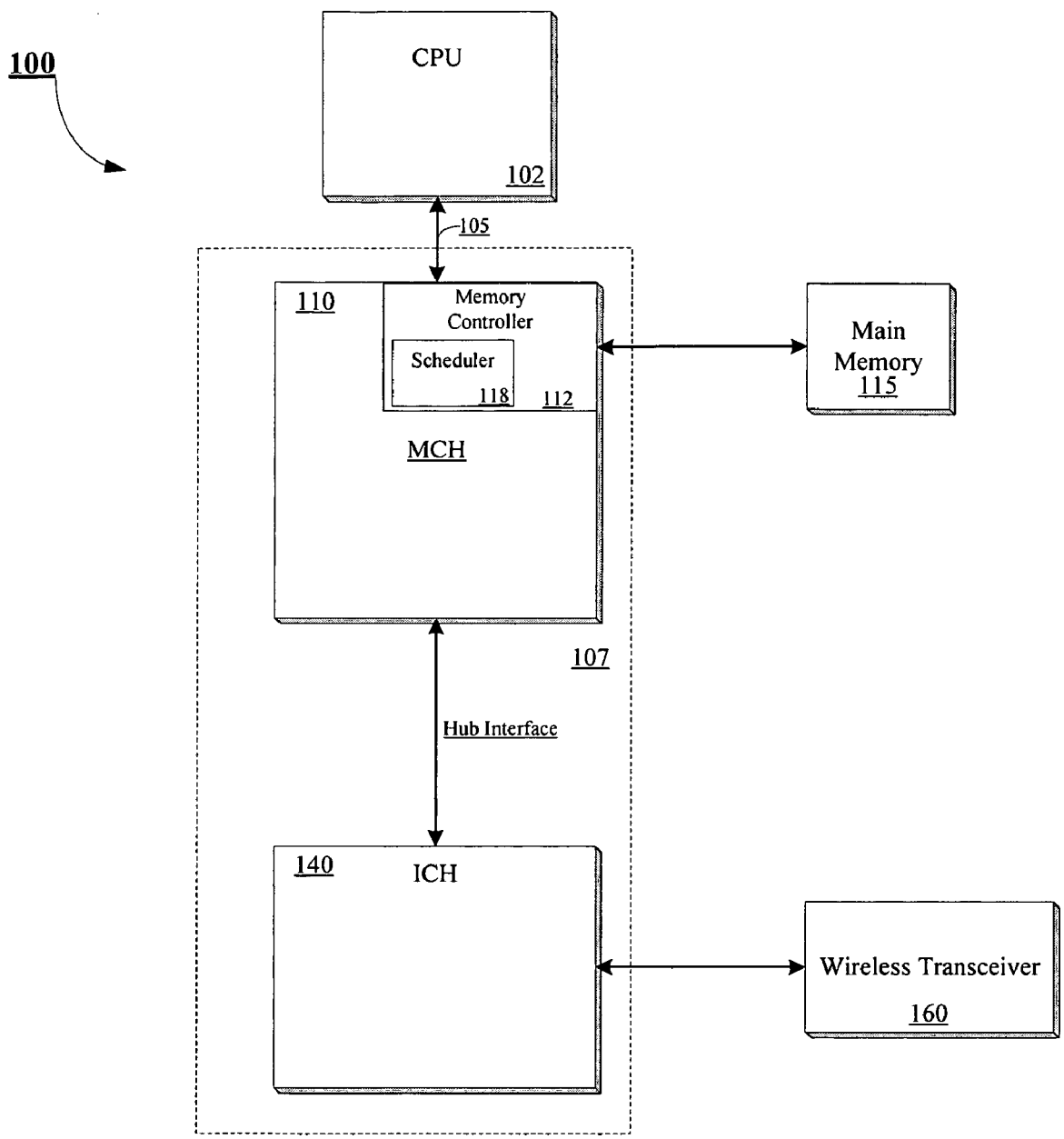
FIG. 1 is a block diagram of one embodiment of a computer system.

FIG. 1 is a block diagram of one embodiment of a computer system 100. Computer system 100 includes a central processing unit (CPU) 102 coupled to interconnect 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented multiple processors, or multiple processor cores.

In a further embodiment, a chipset 107 is also coupled to interconnect 105. Chipset 107 may include a memory control hub (MCH) 110. MCH 110 may include a memory controller 112 that is coupled to a main system memory 115. Main system memory 115 stores data and sequences of instructions that are executed by CPU 102 or any other device included in system 100.

In one embodiment, main system memory 115 includes dynamic random access memory (DRAM) incorporating a FB-DIMM architecture; however, main system memory 115 may be implemented using other memory types. Additional devices may also be coupled to interconnect 105, such as multiple CPUs and/or multiple system memories.

MCH 110 may be coupled to an input/output control hub (ICH) 140 via a hub interface. ICH 140 provides an interface to input/output (I/O) devices within computer system 100. ICH 140 may support standard I/O operations on I/O interconnects such as peripheral component interconnect (PCI), accelerated graphics port (AGP), universal serial interconnect (USB), low pin count (LPC) interconnect, or any other kind of I/O interconnect (not shown). In one embodiment, ICH 140 is coupled to a wireless transceiver 160.

Figure 5:
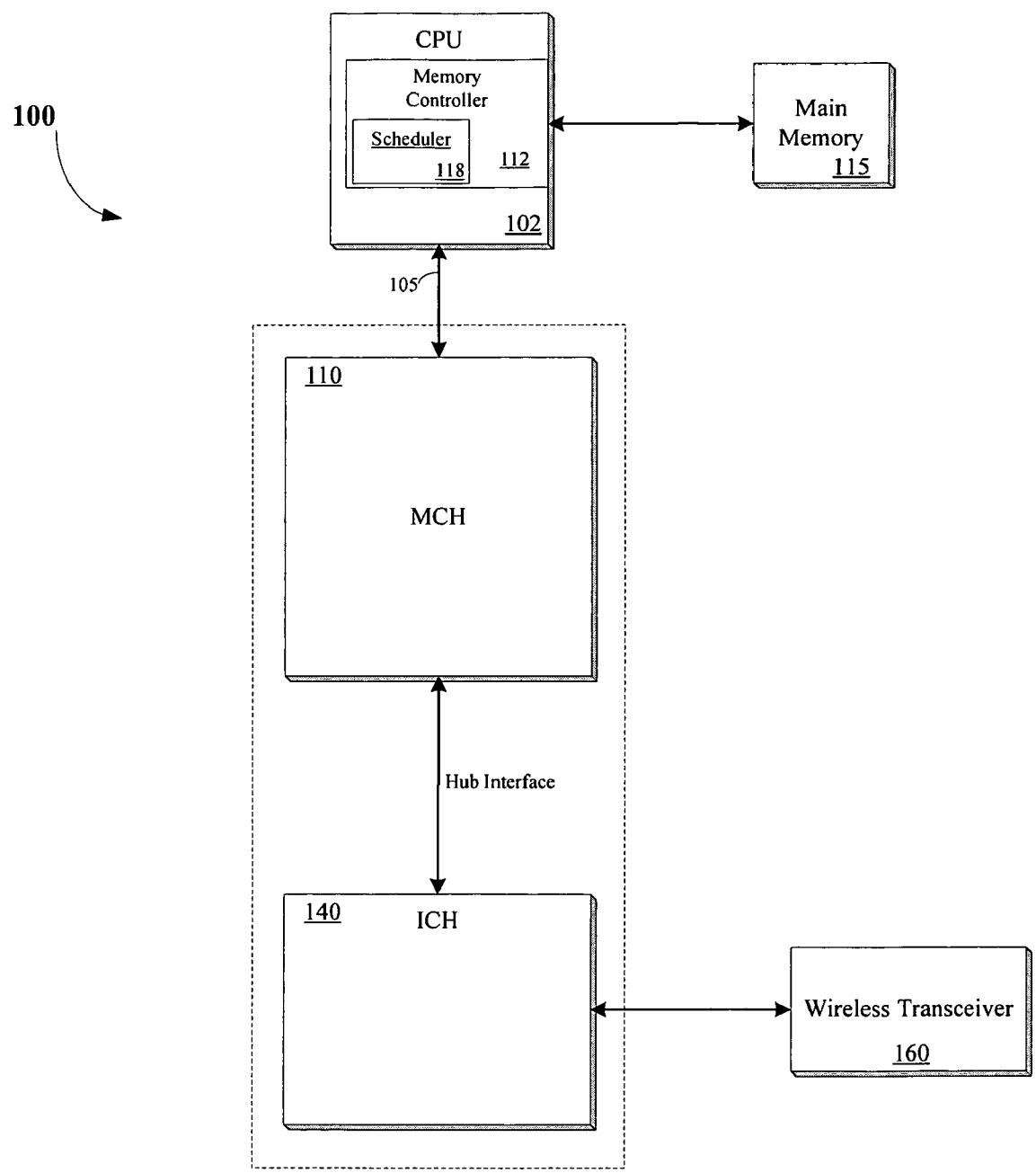
FIG. 5 is a block diagram of another embodiment of a computer system.

FIG. 5 illustrates another embodiment of computer system 100. In this embodiment, memory controller 112 is included within CPU 102, as a result memory 115 is coupled to CPU 102.

According to one embodiment, memory controller 112 includes a scheduler 118 that schedules read and write commands to memory 115. As discussed above, although FB-DIMM theoretically enables three DRAM commands in one cycle, single mode commands are typically implemented to reduce complexity in scheduler design. However, in one command scenarios, every write command introduces a minimum two idle frames in NB lanes.

Figure 2:
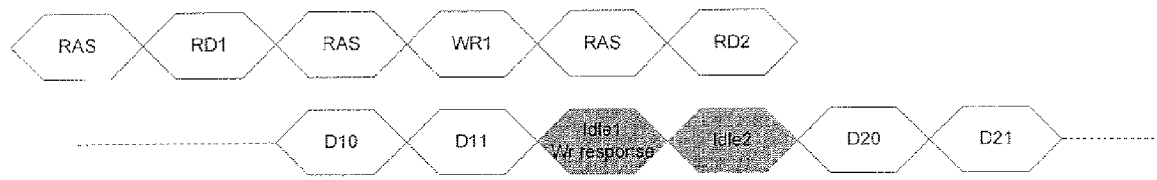
FIG. 2 is a timing diagram for a conventional FB-DIMM system.

FIG. 2 is a timing diagram for a conventional FB-DIMM system illustrating how idle frames are included in the NB lanes due to write commands. Initially, a first read command is transmitted from the memory controller to FB-DIMM (or southbound (SB)) lanes. The first read command includes a Row Address Strobe (RAS) command frame and a first read CAS (or RD1) frame. The next two frames transmitted on the SB lanes are a RAS command frame and a first write CAS (or WR1) frame of a first write command. Subsequently, two more frames of a second read command are transmitted.

While the third and fourth frames are being transmitted via the SB lanes, data frames D10 and D11, corresponding to the first read command, are being received at the memory controller via the NB lanes. However, the next two frames on the NB lanes are idle because corresponding write frames were transmitted on the SB lanes, resulting in no data being received on the NB lanes for two frames prior to data frames D20 and D21 being received, corresponding to the second read command. Thus, out of six frames received on the NB lanes, only four includes useful data, while two frames are wasted on a write command.

According to one embodiment, scheduler 118 optimizes the write commands to avoid idle NB frames attributed to the write commands. As discussed above, FB-DIMM devices allow the memory controller to schedule up to three memory commands in one frame. Thus, scheduling at the memory controller can be logically divided as slots A, B and C. As per the FB-DIMM specification, slots B and C can be used for transmitting either command or write data. Typically, a scheduler takes care of data multiplexing whenever required. The three command supporting schedulers have additional complexity in multiplexing data in B and C slots.

Figure 3:
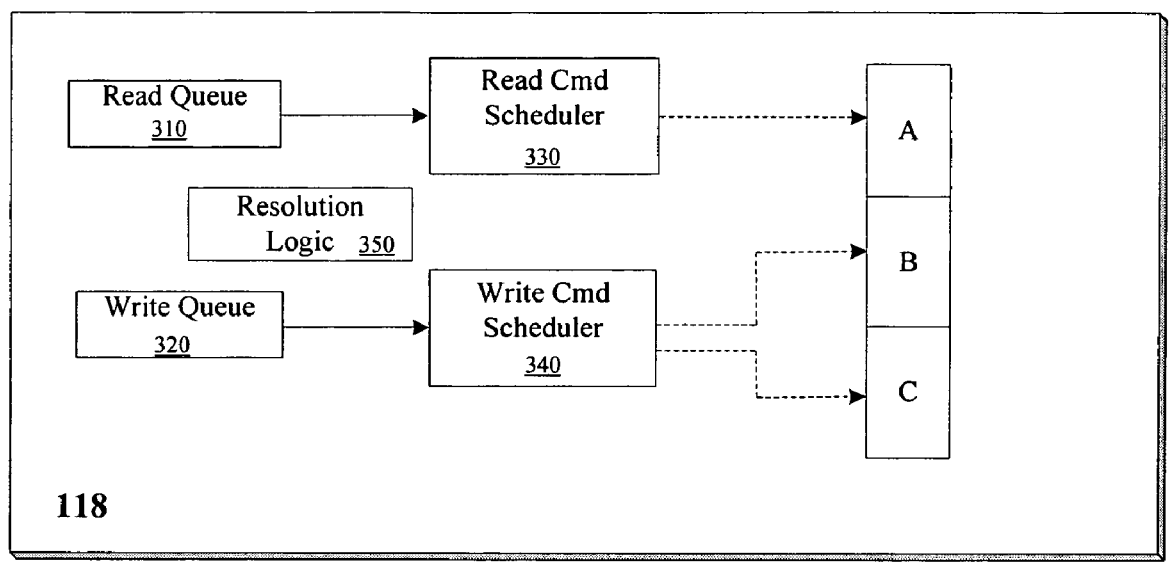
FIG. 3 illustrates one embodiment of a scheduler.

According to one embodiment, scheduler 118 always uses slot A for read commands, while using either of slots B and C for write commands. FIG. 3 is a logical illustration of one embodiment of scheduler 118. Scheduler 118 includes a read queue 310, write queue 320, a read command scheduler 330 and write command scheduler 340, and three slots (A, B and C).

As shown in FIG. 3, read command scheduler 330 and write command scheduler 340 schedule read and write commands, respectively. Read command scheduler 330 inserts read commands into slot A. Meanwhile, write command scheduler 340 may insert write commands into either of slots B and C.

Figure 4:
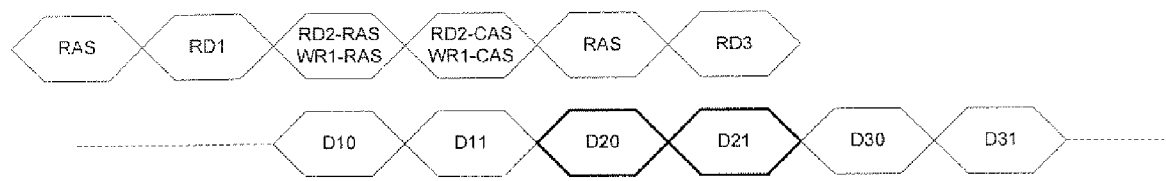
FIG. 4 illustrates a timing diagram for one embodiment of a FB-DIMM system.

FIG. 4 is a timing diagram for one embodiment of scheduler 118. Initially, a first read command, including RAS and RD1, is transmitted from memory controller 112 to memory 115 on the SB lanes by read command scheduler 330 inserting a first read command into slot A. The next two frames transmitted on the SB lanes include both a read command and a write command.

The read and write commands are transmitted on the SB lanes by read command scheduler 330 inserting a second read command into slot A and write command scheduler 340 inserting a write command into slots B or C. Subsequently, two more frames of a third read command are transmitted on the SB lanes by read command scheduler 330 inserting a third read command into slot A.

While the third and fourth frames are being transmitted via the SB lanes, data frames D10 and D11, corresponding to the first read command, are being received at memory controller 112 via the NB lanes. The next two frames on the NB lanes are data frames D20 and D21 corresponding to the second read command. Finally data frames D30 and D31 being received, corresponding to the third read command.

According to one embodiment, a write response is acknowledged after receiving a STATUS response to a synchronization frame's (SYNC) signal. In such an embodiment, if STATUS is the response for SYNC, all write transactions prior to the SYNC occurred with no error. However if STATUS gives ALERT patterns, the writes have failed. As a result, all data is disregarded and all writes prior to the previous SYNC are repeated.

In another embodiment, a write response is acknowledged after valid error free read data. In such an embodiment, the fact that read data received on the NB lanes, corresponding to the read command transmitted along with the write command on the SB lanes (e.g., D20 and D21 in FIG. 4) were received at memory controller 114 with no error guarantees that the write data was received at memory 115 with no error.

According to one embodiment, logic 350 is included within scheduler 118 to resolve conflicts between commands which were scheduled, but have a response pending (e.g., "in-flight memory commands") and commands exposed from command queues 310 and 320. Logic 350 feeds the resolved commands into schedulers 330 and 340. In a further embodiment, logic 350 considers the command currently sitting in slot A before feeding a command to write command scheduler 340.

Because 20-30% of commands in a computer system are write commands that decrease bandwidth for read commands in one command FB-DIMM schedulers, the above-described invention enables read bandwidth to not be disturbed by write commands by providing logically dedicated channels for write commands.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
    a memory controller to schedule a read command component to a first frame via a first dedicated command slot, schedule a write command component and data corresponding to the write command component to the first frame via a dedicated second or third command slot, and receive a second set of frames corresponding to the read command component from a memory device immediately after receiving a first set of frames corresponding to a first read command component.

2. The system of claim 1 wherein the memory controller comprises:
    a read command scheduler to schedule read commands onto the first dedicated command slot; and
    a write command scheduler to schedule write commands onto the second or third dedicated command slots.

3. The system of claim 2 wherein the memory controller further comprises:
    a read queue coupled to the read command scheduler; and
    a write queue coupled to the write command scheduler.

4. The system of claim 3 wherein the memory controller further comprises resolution logic to resolve conflicts between in-flight memory commands and commands from the read and write queues.

5. The system of claim 4 wherein the resolution logic forwards resolved commands into the read command scheduler and the write command scheduler.

6. The system of claim 1 wherein the memory controller acknowledges a write response after transmitting frames including a write command and corresponding data.

7. The system of claim 6 wherein the memory controller acknowledges the write response upon receiving a response status of a synchronization frame.

8. The system of claim 6 wherein the memory controller acknowledged the write response upon receiving data corresponding to a read command transmitted in the first frame with the write command.

9. A method comprising:
a memory controller scheduling a first read command component to a first frame via a first command slot dedicated to read commands;
the memory controller scheduling a second read command component to a second frame via the first command slot; and
the memory controller scheduling a first write command component and data corresponding to the first write command component to the second frame via a second command slot or a third command slot dedicated to write commands;
receiving a first set of frames corresponding to the first read command component from a memory device; and
receiving a second set of frames corresponding to the second read command component from the memory device immediately after receiving the first set of frames.

10. The method of claim 9 further comprising:
transmitting the first frame to a memory device; and
transmitting the second frame to the memory device.

11. A memory controller comprising:
command slots to insert one or more commands into a frame;
a read command scheduler to schedule a read command component to a first frame via a first dedicated command slot; and
a write command scheduler to schedule a write command component and data corresponding to the write command component to the first frame via dedicated second or third command slots, the memory controller receiving a second set of frames corresponding to the read command component from a memory device immediately after receiving a first set of frames corresponding to a first read command component.

12. The memory controller of claim 11 further comprising:
a read queue coupled to the read command scheduler; and
a write queue coupled to the write command scheduler.

13. The memory controller of claim 12 further comprising resolution logic to resolve conflicts between in-flight memory commands and commands from the read and write queues.

14. The memory controller of claim 13 wherein the resolution logic forwards resolved commands into the read command scheduler and the write command scheduler.

15. The memory controller of claim 11 wherein the memory controller acknowledges a write response after transmitting frames including a write command and corresponding data.

16. A system comprising:
Fully Buffered DIMM memory device; and
a memory controller, coupled to the memory device, to schedule a read command component to a first frame via a first dedicated command slot, schedule a write command component and data corresponding to the write command component to the first frame via a dedicated second or third command slot, and receive a second set of frames corresponding to the read command component from the memory device immediately after receiving a first set of frames corresponding to a first read command component.

17. The system of claim 16 wherein a first read command and a first write command are scheduled into a first frame.

18. The system of claim 16 wherein the memory controller comprises:
a read command scheduler to schedule read commands onto the first dedicated command slot; and
a write command scheduler to schedule write commands onto the second and third dedicated command slots.

* * * * *